United States Patent
Mansour et al.

(10) Patent No.: US 9,444,570 B1
(45) Date of Patent: Sep. 13, 2016

(54) UTILIZATION OF MIMO REFERENCE SIGNAL RESOURCE BLOCKS

(71) Applicant: Sprint Spectrum LP, Overland Park, KS (US)

(72) Inventors: Nagi Mansour, Arlington, VA (US); Emerino J. Marchetti, Clifton, VA (US); Christopher Melus, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 151 days.

(21) Appl. No.: 13/917,453

(22) Filed: Jun. 13, 2013

(51) Int. Cl.
*H04B 7/00* (2006.01)
*H04J 11/00* (2006.01)

(52) U.S. Cl.
CPC ...................................... *H04J 11/00* (2013.01)

(58) Field of Classification Search
CPC .... H04L 5/001; H04L 5/0053; H04L 1/0031
USPC .................. 370/329, 328, 241; 455/450, 509
See application file for complete search history.

(56) References Cited

U.S. PATENT DOCUMENTS

| | | | | |
|---|---|---|---|---|
| 2011/0007831 A1* | 1/2011 | Moon | ................... | H04L 5/0007 375/260 |
| 2011/0269492 A1* | 11/2011 | Wang | ..................... | H04L 5/003 455/509 |
| 2011/0274061 A1* | 11/2011 | Li | .......................... | H04L 5/001 370/329 |
| 2011/0312328 A1* | 12/2011 | Choi et al. | ..................... | 455/450 |
| 2012/0063321 A1* | 3/2012 | Chandrasekhar et al. | .... | 370/241 |

\* cited by examiner

*Primary Examiner* — Dang Ton
*Assistant Examiner* — Sai Aung

(57) ABSTRACT

Reference signals (a.k.a., pilot signals) are broadcast to aid in at least channel estimation, cell selection, and handover. When a multi-antenna mode (i.e., MIMO) is used data signals on one antenna should not interfere with reference signals on another antenna. Reference signal resource elements (a.k.a., slots) being broadcast from one antenna are multiplied by a first Walsh code and the data (or reference) signal resource elements being broadcast from another antenna are multiplied by second Walsh code in the same family. Multiplication by Walsh codes reduces or eliminates the correlation between the data resource elements on a first antenna and the reference signal resource elements simultaneously broadcast on a second antenna.

19 Claims, 5 Drawing Sheets

UTILIZATION OF MIMO REFERENCE SIGNAL RESOURCE BLOCKS

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

To aid in channel estimation, cell selection, and handover, these standards may specify that reference signals (a.k.a., pilot signals) are broadcast. According to some estimates, these reference signals may occupy, as non-data carrying overhead, as much as 20% of the available channel bandwidth.

Overview

In an embodiment, a method of operating a communication system includes allocating a first subframe of air interface resource elements and allocating a second subframe of air interface resource elements. The first subframe comprises a first plurality of air interface resource elements. The first plurality of air interface resource elements include a first plurality of reference signal resource elements and a first plurality data signal resource elements. The second subframe comprises a second plurality of air interface resource elements. The second plurality of air interface resource elements include a second plurality of reference signal resource elements and a second plurality data signal resource elements. The second plurality of data signal resource elements corresponding in time and frequency to the first plurality of data signal resource elements. Using a multi-antenna mode, the first subframe is simultaneously transmitted from a first antenna while the second subframe is transmitted from a second antenna. The first subframe is transmitted after applying a first orthogonal code of a family of orthogonal codes to said first subframe. The second subframe is transmitted after applying a second orthogonal code of the family of orthogonal codes to said second subframe.

In an embodiment, a communication system includes a wireless station that communicates using a multi-antenna air interface. The wireless station simultaneously transmits a first subframe from a first antenna and a second subframe from a second antenna. The first subframe has a first plurality of reference signal air interface elements and a first plurality of data signal air interface elements. The second subframe has a second plurality of reference signal air interface elements and a second plurality of data signal air interface elements. The first plurality of reference signal air interface elements are encoded with a first orthogonal code of a family of orthogonal codes and the second plurality of data signal air interface elements encoded with a second orthogonal code of the family of orthogonal codes. An air interface resource allocation system places the second plurality of data signal air interface elements in time and frequency locations in the second subframe that correspond to time and frequency locations of the first plurality of reference signal air interface elements in the first subframe.

In an embodiment, a method of operating a communication system includes allocating a first subframe of air interface resource elements. The first subframe includes a first plurality of air interface resource elements. The first plurality of air interface resource elements includes a first plurality of reference signal resource elements and a first plurality data signal resource elements. A second subframe of air interface resource elements is also allocated. The second subframe includes a second plurality of air interface resource elements. The second plurality of air interface resource elements includes a second plurality of reference signal resource elements and a second plurality data signal resource elements. The second plurality of reference signal resource elements correspond in time and frequency to the first plurality of reference signal resource elements. Using a multi-antenna mode, the first subframe is transmitted from a first antenna simultaneously with the second subframe's transmission from a second antenna. The first subframe is transmitted after a first orthogonal code of a family of orthogonal codes is applied to the first plurality of reference signal resource elements. The second subframe is transmitted after a second orthogonal code of the family of orthogonal codes is applied to the second plurality of reference signal resource elements.

DETAILED DESCRIPTION

In an embodiment, reference signals (a.k.a., pilot signals) are broadcast to aid in at least channel estimation, cell selection, and handover. When a multi-antenna mode (a.k.a., multiple-input multiple-output—MIMO) is used, each antenna transmit own reference signals, control info, data, and resource elements related to antennas reference signal locations. Some wireless standards (e.g., LTE) specify that no signal may be transmitted that corresponds to reference signal locations on one antenna while another antenna is transmitting its own reference signals. Locations in time and frequency of reference signals on the first antenna are different than the locations in time and frequency domain of reference signals on the second antenna to allow a wireless device to identify the signals received from the various antennas. In an embodiment, different orthogonal codes are applied to the subframes being broadcast on one antenna and to the subframes being simultaneously transmitted on another antenna. In an embodiment, different orthogonal codes are applied to the reference signal resource elements and data being broadcast on one antenna and to the corresponding reference signal resource elements and data resource elements being simultaneously transmitted on another antenna. In yet another embodiment, different orthogonal codes can be applied to the reference signal resource elements being simultaneously broadcast on each antenna. The different orthogonal codes can be applied to a subset of the resource elements of a subframe and/or frame, or may be applied to all of the resource elements of a frame and/or subframe.

For example, the reference and data signals being broadcast from one antenna are multiplied by a first Walsh code or any other orthogonal code type, and the reference signal and data resource elements being broadcast from another antenna are multiplied by second Walsh code in the same family. Multiplication by Walsh codes reduces or eliminates the correlation between the data resource elements and the reference signal resource elements on the first antenna from the data and resource element of the second antenna. Accordingly, this allows previously empty resource elements to be used to carry data instead of specifying that they carry no signal (i.e., discontinuous transmission). Thus, the data resource elements corresponding to reference signal resource elements which are broadcast on other antennas can be used to carry data. This reduces overhead and thereby improves and results in an increase in capacity of the throughput of the wireless communication system.

Figure 1:
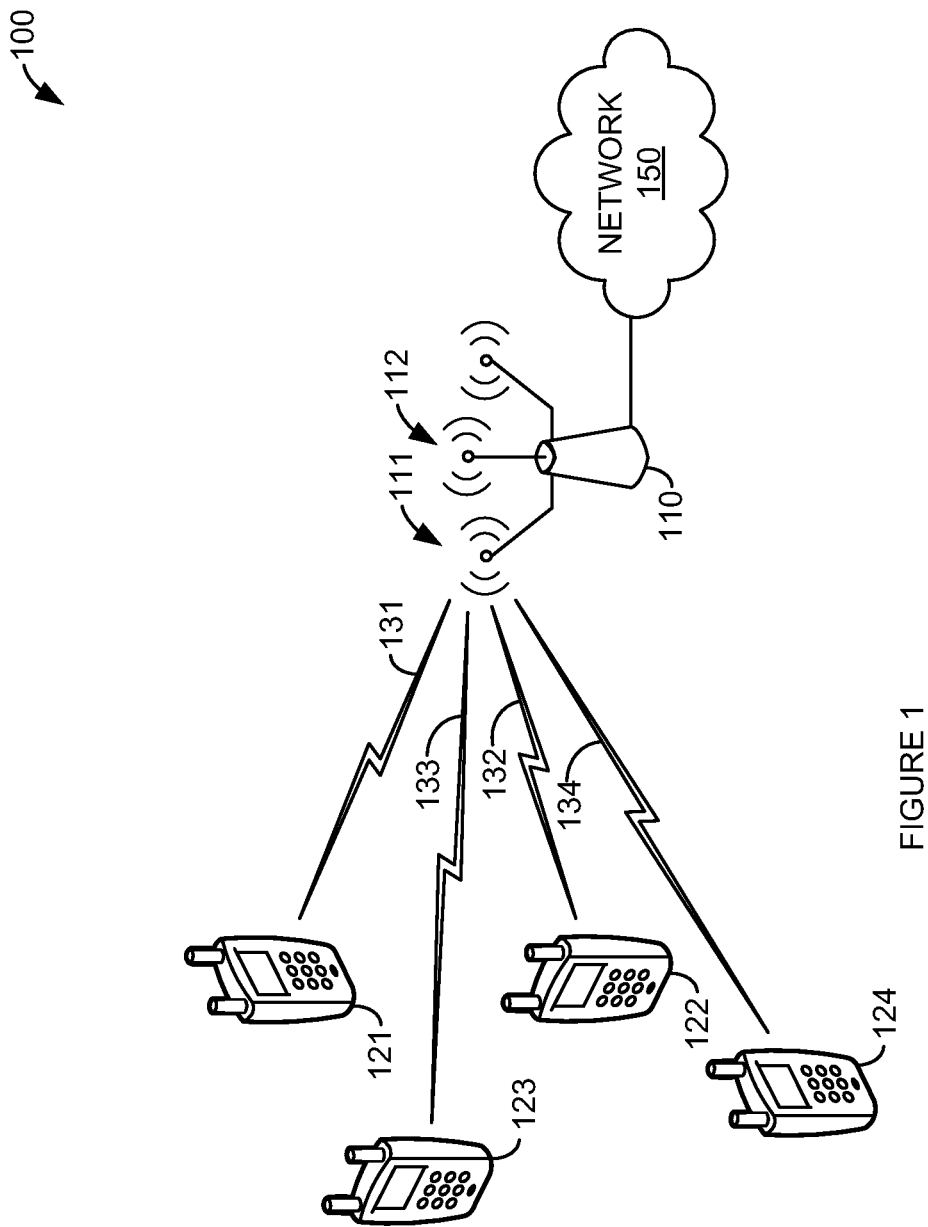
FIG. 1 is a block diagram of a communication system.

FIG. 1 is a block diagram of a communication system. In FIG. 1 communication system 100 includes access node 110, wireless device 121, wireless device 122, wireless device 123, wireless device 124, and network 150. Wireless device 121 is operatively coupled to access node 110 by wireless link 131. Wireless device 122 is operatively coupled to access node 110 by wireless link 132. Wireless device 123 is operatively coupled to access node 110 by wireless link 133. Wireless device 124 is operatively coupled to access node 110 by wireless link 134. Network 150 is operatively coupled to access node 110. Access node 110 includes at least a first antenna 111 and a second antenna 112.

Communication system 100 is a communication network that can provide wireless communication to wireless devices 121-124. Network 150 is a communication network that can provide communication between access node 110 and other wired or wireless networks. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 150 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 150 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (Wi-MAX).

Links between access node 110 and network 150 can be, for example, twisted pair cable, coaxial cable or fiber optic cable, or combinations thereof. Wireless links 131-134 can be a radio frequency, microwave, infrared, or other similar signal that uses orthogonal frequency division multiplexing (OFDM). Wireless links 131-134 can use a suitable communication protocol, for example, Worldwide Interoperability for Microwave Access (WiMAX), or Long Term Evolution (LTE), or combinations thereof. Other wireless protocols can also be used.

Other network elements may be present in communication system 100 (and present in wireless network 150, in particular) to facilitate wireless communication to/from wireless devices 121-124 but are omitted for clarity, such as base stations, base station controllers, gateways, mobile switching centers, dispatch application processors, and location registers such as a home location register or visitor location register. Furthermore, other network elements may be present to facilitate communication between access node 110 and network 150 which are omitted for clarity, including additional processing nodes, routers, gateways, and physical and/or wireless data links for carrying data among the various network elements.

Wireless devices 121-124 may be any devices, systems, combination of devices, or other such communication platforms capable of communicating wirelessly with access node 110. One or more of wireless device 121-124 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with via access node 110, and network 150. Other types of communication platforms are possible.

Wireless devices 121-124 may establish communication sessions with access node 110 in order to receive communication service. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Access node 110 is a network node capable of providing wireless communication to wireless devices 121-124. Access node 110 can be, for example, a base transceiver station, a radio access node, an eNodeB device, or an enhanced eNodeB device. Access node 110 communicates information to wireless devices 121-124 via wireless links 131-134, respectively. This information may include reference signals and data signals. Access node 110 communicates information via wireless links 131-134.

Access node 110 may communicate information via wireless links 131-134 using subframes. A subframe may be divided into basic air interface units. These air interface units may be referred to as resource blocks. For example a resource block may be defined in both the time and frequency domains. A resource block may occupy a discrete time interval in the time domain and a discrete number of carriers in the frequency domain. A resource block may be further divided into smaller units in the time and frequency domains. These smaller units may be referred to as resource elements.

For example long-term evolution (LTE) defines a resource block as 0.5 mS in the time domain and hundred and 180 kHz in the frequency domain. The 0.5 mS in the time domain can hold 6 or 7 OFDM symbols for each of 12 subcarriers (15 kHz each) that make up the 180 kHz in the frequency domain. The grid generated by subcarriers in the frequency domain and symbols and the time domain defines a set of resource elements. Thus, a single resource block may have 84 (or 72) resource elements. A single resource element can accommodate a single modulation symbol.

In an embodiment, communication system 100 allocates a frame and/or subframe of air interface resource elements to be transmitted via a first antenna (e.g., antenna 111). These resource elements include reference signal resource elements and data signal resource elements. The reference signal resource elements carry information, at specified power levels, which is known or can be deduced. Thus the reference signal resource elements may be used for synchronization, channel estimation, cell selection, and handover. The data signal resource elements carry the information associated with physical channels. In other words, the data signal resource elements carry data and/or control information for wireless links 131-134.

Communication system 100 also allocates a subframe of air interface resource elements to be transmitted via a second antenna (e.g., antenna 112). These resource elements in the subframe to be transmitted via the second antenna also include reference signal resource elements and data signal resource elements. At least some of the data signal resource elements allocated to be transmitted via the second antenna correspond in time and frequency to reference signal resource elements to be transmitted via the first antenna. In other words, when a subframe is simultaneously being transmitted from the first antenna 111 and another subframe is being transmitted from the second antenna 112, at least some of the reference signal resource elements in the first subframe will overlap at least some of the data signal resource elements in the second subframe.

Subframes (and/or frames) are transmitted from the first antenna 111 and the second antenna 112 simultaneously, using a multi-antenna mode. This multi-antenna mode may be referred to as MIMO. MIMO may also be known as a spatial multiplexing. Spatial multiplexing increases transmit diversity. Increased transmit diversity increases the resilience of the propagation channel.

In an embodiment, the resource elements allocating in a first subframe (to be transmitted by the first antenna) include a first plurality of air interface resource elements. This first plurality of air interface resource elements include a first plurality of reference signal resource elements and a first plurality data signal resource elements. In other words, there are at least two types of resource elements in the first subframe and/or frame: reference signal resource elements and data resource elements. The resource elements allocating in a second subframe (to be transmitted by the second antenna), include a second plurality of air interface resource elements. This second plurality of air interface resource elements including a second plurality of reference signal resource elements and a second plurality data signal resource elements. In other words, similar to the first subframe and/or frame, there are at least two types of resource elements in the second subframe and/or frame: reference signal resource elements and data resource elements.

Communication system 100 applies a first orthogonal code from a family of orthogonal codes to the first subframe of resource elements. In other words, communication system 100 multiplies, exclusive-OR's (XORs), or otherwise encodes, the first subframe of resource elements by the first orthogonal code. Likewise communication system 100 applies a second orthogonal code from the family of orthogonal codes to the second subframe of resource elements. The application of different orthogonal codes to the first and second subframes reduces or eliminates the correlation between corresponding resource elements in the two subframes. The reduced correlation between corresponding resource elements in the two subframes reduces or eliminates interference between corresponding resource elements (and hence between the subframes and/or frames, themselves).

After applying a first orthogonal code of a family of orthogonal codes to the first subframe, and using a multi-antenna mode, the first subframe is transmitted from a first antenna. At the same time, and after applying the second orthogonal code to the second subframe, the second subframe is transmitted from a second antenna.

It should be understood that when the first subframe and the second subframe are transmitted simultaneously, the first plurality of data signal resource elements correspond in time and frequency to said second plurality of reference signal resource elements. This can result in the second plurality of data signal resource elements corresponding in time and frequency to said first plurality of data signal resource elements. Also, the first plurality of data signal resource elements can correspond in time and frequency to at least a portion of said second plurality of reference signal resource elements and correspond in time and frequency to at least a portion of said second plurality of data signal resource elements. Similarly, the first plurality of reference signal resource elements can correspond in time and frequency to at least a portion of said second plurality of reference signal resource elements and also correspond in time and frequency to at least a portion of said second plurality of data signal resource elements. The first subframe can be part of a first frame and the second subframe can be part of a second frame.

In an embodiment, at least the reference signal resource elements transmitted via the first antenna are encoded using a first orthogonal code of a family of orthogonal codes. Likewise, at least the reference signal resource elements transmitted via the second antenna are encoded using a second orthogonal code of the family of orthogonal codes. In another embodiment, at least the reference signal resource elements transmitted via the second antenna that overlap in time and frequency with the reference signal resource elements transmitted via the first antenna are encoded using a second orthogonal code of the family of orthogonal codes.

In an embodiment, at least the reference signal resource elements transmitted via the first antenna are encoded using the first orthogonal code of a family of orthogonal codes.

Likewise, at least the data signal resource elements transmitted via the second antenna that overlap in time and frequency the reference signal resource elements transmitted via the first antenna are encoded using the second orthogonal code of the family of orthogonal codes By applying (or overlaying) a unique orthogonal code to the reference signal resource elements transmitted from one antenna and another unique orthogonal code to the reference signal resource elements transmitted simultaneously from another antenna, the previously empty holes in first antenna that are related to reference signal of other antenna can be used to transmit data. It should also be understood that by applying (or overlaying) a unique orthogonal code to the reference signal resource elements transmitted from one antenna and another unique orthogonal code to the reference signal resource elements transmitted simultaneously from another antenna, interference between the respective reference signal resource elements of the two simultaneously transmitted subframes is eliminated or reduced.

Likewise, by applying (or overlaying) a unique orthogonal code to the reference and data signal resource elements transmitted from one antenna and another unique orthogonal code to the reference and data signal resource elements transmitted simultaneously from another antenna, interference between the reference signal resource elements of the first subframe and the data signal resource elements of the second, simultaneously transmitted, subframe is eliminated or reduced. This allows the use of what were previously holes in the frames transmitted from the first antenna related to reference signal resource elements of the frames transmitted from the other antenna, and what were previously holes of in the frames transmitted from the other antenna related to reference signal resource elements in the frames transmitted from first antenna to both transmit data. It should also be understood that the use of either more reference signal resource elements, or more data signal resource elements is possible.

Since the first orthogonal code and the second orthogonal code are derived from the same family of orthogonal codes, the first orthogonal code and the second orthogonal code are orthogonal to each other. In other words the cross correlation between the first orthogonal code and the second orthogonal code (and any other orthogonal codes in the family of orthogonal codes) have a cross correlation between each other that are zero. In an example, Walsh codes may be used as the family of orthogonal codes. It should be understood that other orthogonal codes, or pseudo-orthogonal codes, such as Gold codes may be used.

Figure 2:
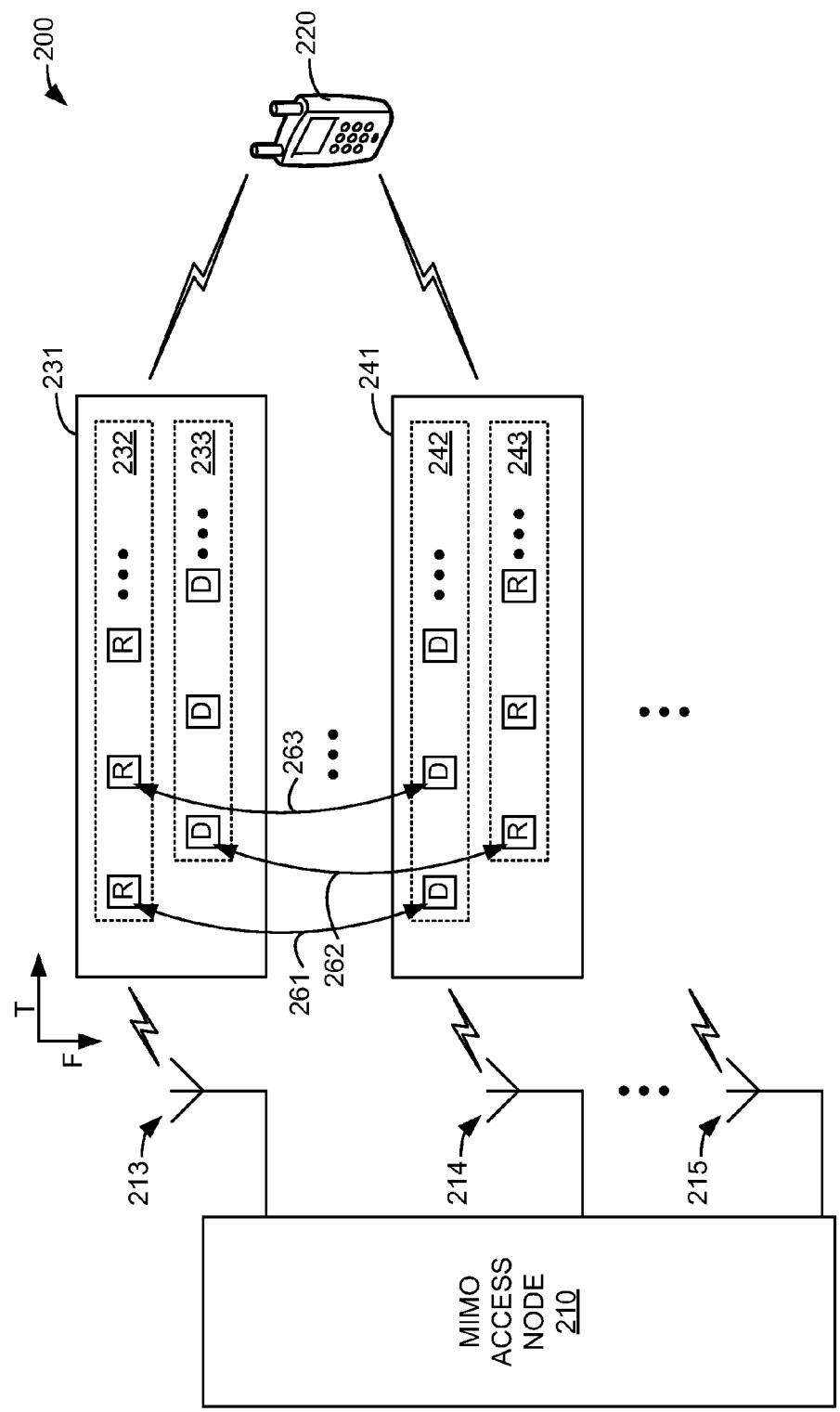
FIG. 2 is an illustration of the simultaneous transmission of multiple subframes of air interface resource elements from multiple antennas.

FIG. 2 is an illustration of the simultaneous transmission of multiple subframes of air interface resource elements from multiple antennas. In FIG. 2, communication system 200 includes MIMO access node 210 and wireless device 220. MIMO access node 210 includes multiple antennas 213-215 transmitting subframes 231-232 that may be received by wireless device 220. Subframe 231 is transmitted by access node 210 via antenna 213. Subframe 241 is transmitted simultaneously with subframe 231 by access node 241 via antenna 214. Other subframes (not shown in FIG. 2) may be transmitted simultaneously with subframe 231 (or 241) by access node 210 via other antennas (e.g., antenna 215).

Subframe 231 includes reference signal resource elements 232. Subframe 231 includes data signal resource elements 233. Subframe 241 includes reference signal resource elements 243. Subframe 241 includes data signal resource elements 242. In an embodiment, at least some of the reference signal resource elements in subframe 231 overlap, in time and frequency, data signal resource elements in subframe 241. This is illustrated in FIG. 2 by arrows 261 and 263. Also, at least some of the data signal resource elements in subframe 231 overlap, in time and frequency, reference signal resource elements in subframe 241. This is illustrated in FIG. 2 by arrow 262.

In an embodiment, a first orthogonal code of a family of orthogonal codes is applied to reference signal resource elements 232 of subframe 231. A second orthogonal code of the family of orthogonal codes is applied to data signal resource elements 242 of subframe 241. Because the first and second orthogonal codes are orthogonal, the interference between data signal resource elements 242 and reference signal resource elements 232 is eliminated or reduced. This improves the ability of data signal resource elements 242 to carry data and/or control information.

In an embodiment, the first orthogonal code of a family of orthogonal codes is applied to data signal resource elements 233 of subframe 231. The second orthogonal code of the family of orthogonal codes is applied to reference signal resource elements 243 of subframe 241. Because the first and second orthogonal codes are orthogonal, the interference between reference signal resource elements 243 and data signal resource elements 233 is eliminated or reduced. This improves the ability of data signal resource elements 233 to carry data and/or control information.

Figure 3:
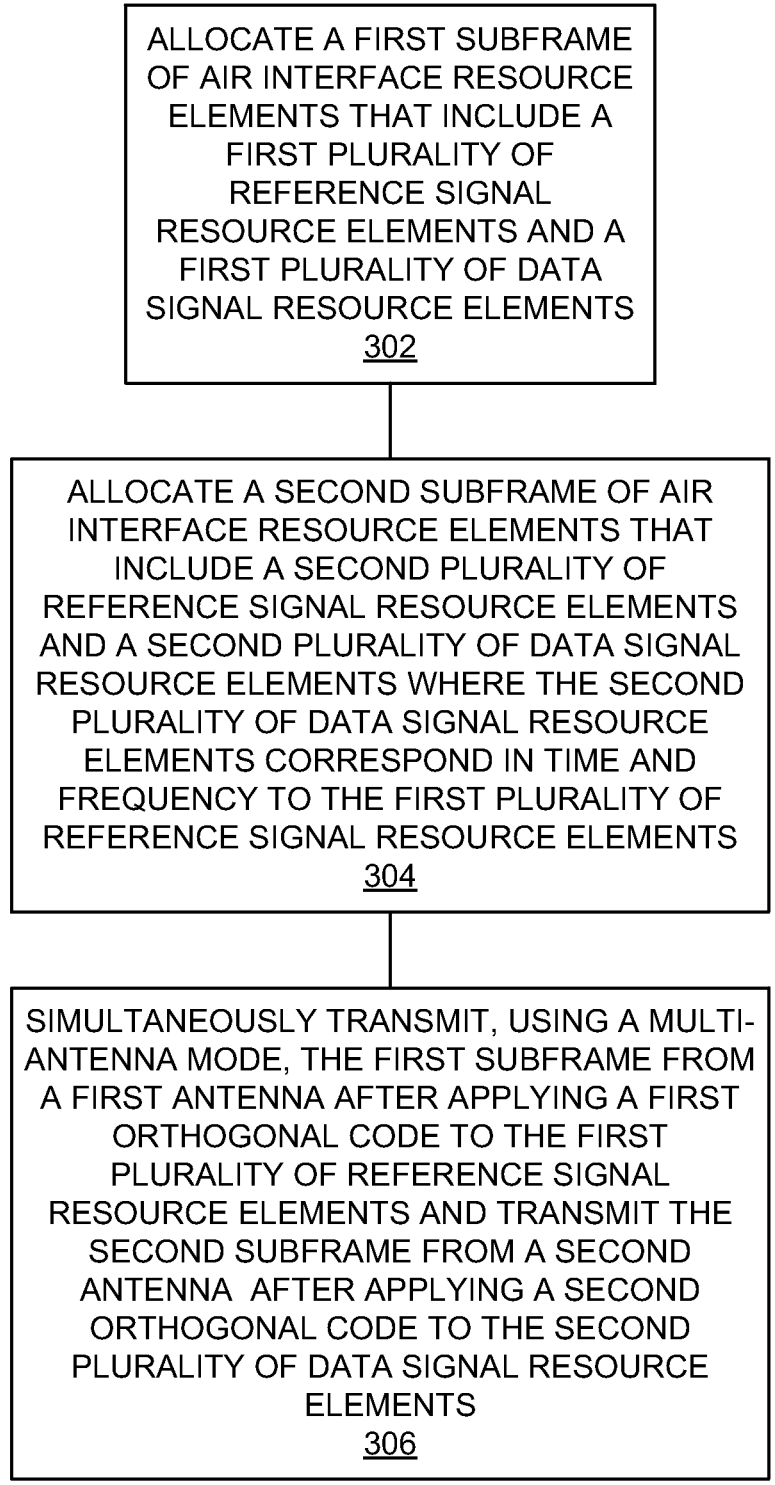
FIG. 3 is a flowchart illustrating a method of operating a communication system.

FIG. 3 is a flowchart illustrating a method of operating a communication system. The steps illustrated in FIG. 3 may be performed by one or more elements of communication system 100 and/or communication system 200. A first subframe of air interface resource elements that includes a first plurality of reference signal resource elements and a first plurality of data signal resource elements is allocated (302). For example, access node 110 may allocate a first subframe composed of air interface resource elements for transmission via a first antenna. This first subframe may include reference signal resource elements and data signal resource elements. The location in time and frequency of the reference signal resource elements and the data signal resource elements may be specified by a wireless standard. In another example, MIMO access node 210 may allocate subframe 231. Subframe 231 includes reference signal resource elements 232 and data signal resource elements 233.

A second subframe of air interface resource elements that includes a second plurality of reference signal resource elements and a second plurality of data signal resource elements where the second plurality of data signal resource elements correspond in time and frequency to the first plurality of reference signal resource elements is allocated (304). For example, access node 110 may allocate a second subframe composed of air interface resource elements for transmission via a second antenna. This second subframe may include reference signal resource elements and data signal resource elements where the data signal resource elements overlap the reference signal resource elements in the first subframe.

In another example, MIMO access node 210 may allocate subframe 241. Subframe 241 includes at least data signal resource elements 242 and reference signal resource elements 243. Subframe 241 includes data signal resource elements 242 that overlap in time and frequency reference signal resource elements 232 in subframe 231 (as illustrated in FIG. 2 by arrows 261 and 263).

Using a multi-antenna mode, the first subframe is simultaneously transmitted with second subframe. The first subframe is transmitted via a first antenna while the second subframe is simultaneously transmitted via a second antenna. The first and second subframes are transmitted after a first orthogonal code is applied to the first plurality of reference signal resource elements and a second orthogonal code is applied to the second plurality of reference signal resource elements (306). For example, access node 110 may transmit, from antenna 111, a first subframe while access node 110 simultaneously transmits, from antenna 112, a second subframe. Before transmitting the first subframe from antenna 111, access node 110 may apply first orthogonal code to one or more reference signal resource elements in the first subframe. Likewise, before transmitting the second subframe from antenna 112, access node 110 may apply a second orthogonal code to one or more data signal resource elements in the second subframe. In particular, the data signal resource elements in the second subframe that are encoded with the second orthogonal code may correspond in time and frequency to the reference signal resource elements in the first subframe that are encoded with the first orthogonal code. In this manner, the data signal resource elements in the second subframe encoded with the second orthogonal code do not interfere with the reference signal resource elements in the first subframe encoded with the first orthogonal code.

In another example, MIMO access node 210, using a multi-antenna mode, may transmit subframe 231 from antenna 213. At the same time, MIMO access node 210 transmits subframe 241 from antenna 214. Before transmitting subframe 231, MIMO access node 210 may encode reference signal resource elements 232 with a first orthogonal code. Before transmitting subframe 241 simultaneously with subframe 231, MIMO access node 210 may encode data signal resource elements 242 with a second orthogonal code. In this manner, data signal resource elements 242 and reference signal resource elements 232 do not interfere with each other. In yet another example, MIMO access node 210 may further in code data signal resource elements 233 with the first orthogonal code. MIMO access node 210 may also encode reference signal resource elements 243 with the second orthogonal code.

Figure 4:
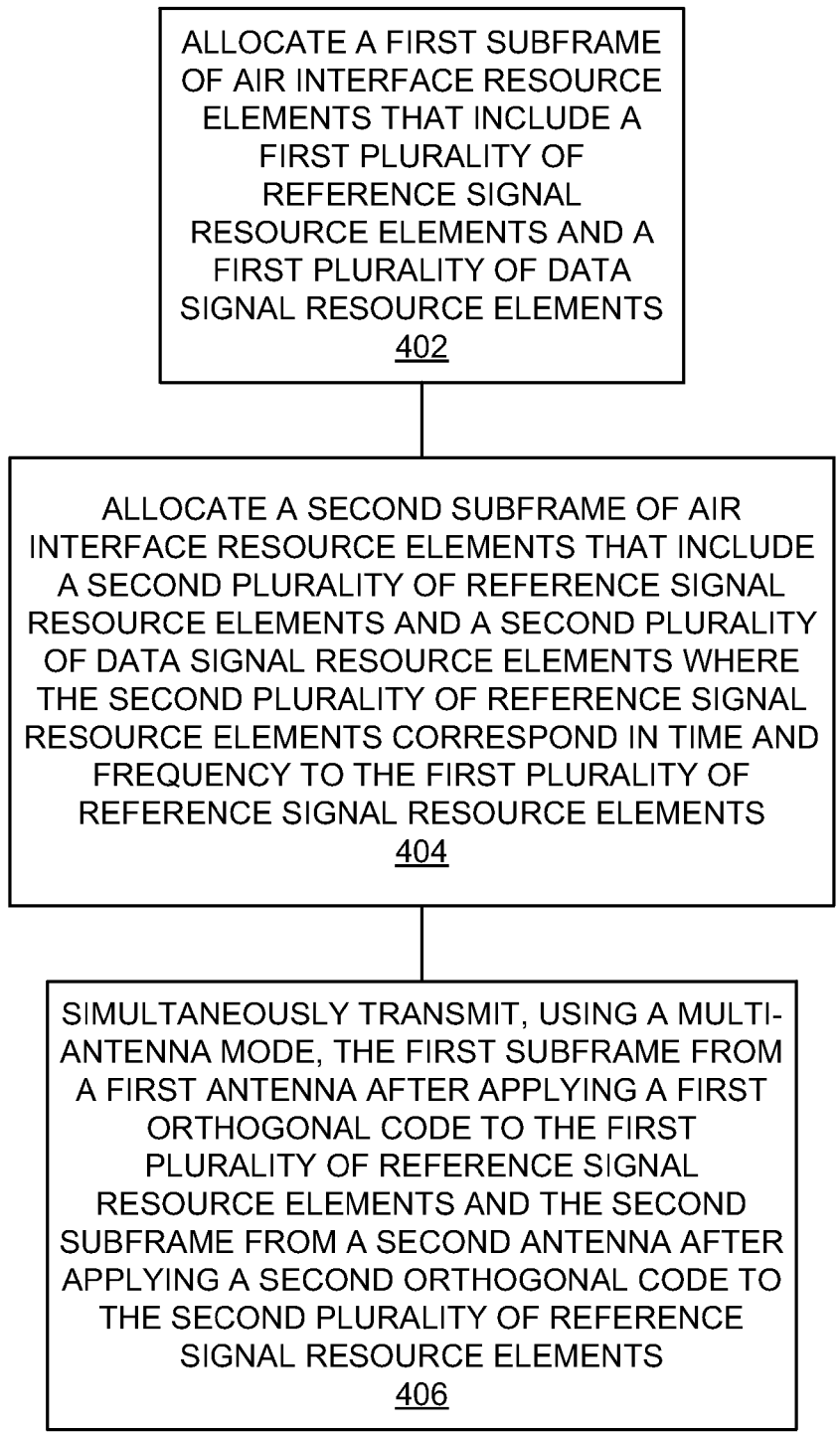
FIG. 4 is a flowchart illustrating a method of transmitting air interface reference signal resource elements from multiple antennas.

FIG. 4 is a flowchart illustrating a method of transmitting air interface reference signal resource elements from multiple antennas. The steps illustrated in FIG. 4 may be performed by one or more elements of communication system 100 and/or communication system 200. A first subframe of air interface resource elements that includes a first plurality of reference signal resource elements and a first plurality of data signal resource elements is allocated (402). For example, access node 110 may allocate a first subframe composed of air interface resource elements for transmission via a first antenna. This first subframe may include reference signal resource elements and data signal resource elements. The location in time and frequency of the reference signal resource elements and the data signal resource elements may be specified by a wireless standard. In another example, MIMO access node 210 may allocate subframe 231. Subframe 231 includes reference signal resource elements 232 and data signal resource elements 233.

A second subframe of air interface resource elements that includes a second plurality of reference signal resource elements and a second plurality of data signal resource elements, where the second plurality of reference signal resource elements correspond in time and frequency to the first plurality of reference signal resource elements, is allocated (404). For example access node 110 may allocate a second subframe composed of air interface resource elements for transmission via a second antenna. This second subframe may include reference signal resource elements and data signal resource elements where the reference signal resource elements overlap the reference signal resource elements in the first subframe. In another example, MIMO access node 210 may allocate subframe 241. Subframe 241 includes reference signal resource elements 243 that overlap in time and frequency reference signal resource elements 232 in subframe 231.

Using a multi-antenna mode, the first subframe is simultaneously transmitted with second subframe. The first subframe is transmitted via a first antenna while the second subframe is simultaneously transmitted via a second antenna. The first and second subframes are transmitted after a first orthogonal code is applied to the first plurality of reference signal resource elements and a second orthogonal code is applied to the second plurality of reference signal resource elements (406). For example, access node 110 may transmit, from antenna 111, a first subframe while access node 110 simultaneously transmits, from antenna 112, a second subframe. Before transmitting the first subframe from antenna 111, access node 110 may apply first orthogonal code to one or more reference signal resource elements in the first subframe. Likewise, before transmitting the second subframe from antenna 112, access node 110 may apply a second orthogonal code to one or more reference signal resource elements in the second subframe. In particular, the reference signal resource elements in the second subframe that are encoded with the second orthogonal code may correspond in time and frequency to the reference signal resource elements in the first subframe that are encoded with the first orthogonal code. In this manner, the reference signal resource elements in the second subframe encoded with the second orthogonal code do not interfere with the reference signal resource elements in the first subframe that are encoded with the first orthogonal code.

In another example, MIMO access node 210, using a multi-antenna mode, may transmit subframe 231 from antenna 213. At the same time, MIMO access node 210 transmits subframe 241 from antenna 214. Before transmitting subframe 231, MIMO access node 210 may encode reference signal resource elements 232 with a first orthogonal code. Before transmitting subframe 241 simultaneously with subframe 231, MIMO access node 210 may encode reference signal resource elements 243 with a second orthogonal code. In this manner, reference signal resource elements 243 and reference signal resource elements 232 do not interfere with each other. In yet another example, MIMO access node 210 may further encode data signal resource elements 233 with the first orthogonal code. MIMO access node 210 may also encode data signal resource elements 242 with the second orthogonal code.

The methods, systems, devices, networks, base station, and equipment described above may be implemented with, contain, or be executed by one or more computer systems and/or processing nodes. The methods described above may also be stored on a non-transitory computer readable medium. Many of the elements of communication system 100 and/or communication system 200 may be, comprise, or include computers systems and/or processing nodes. This includes, but is not limited to: wireless devices 121-124, access node 110, MIMO access node 210, wireless device 220, and network 150.

Figure 5:
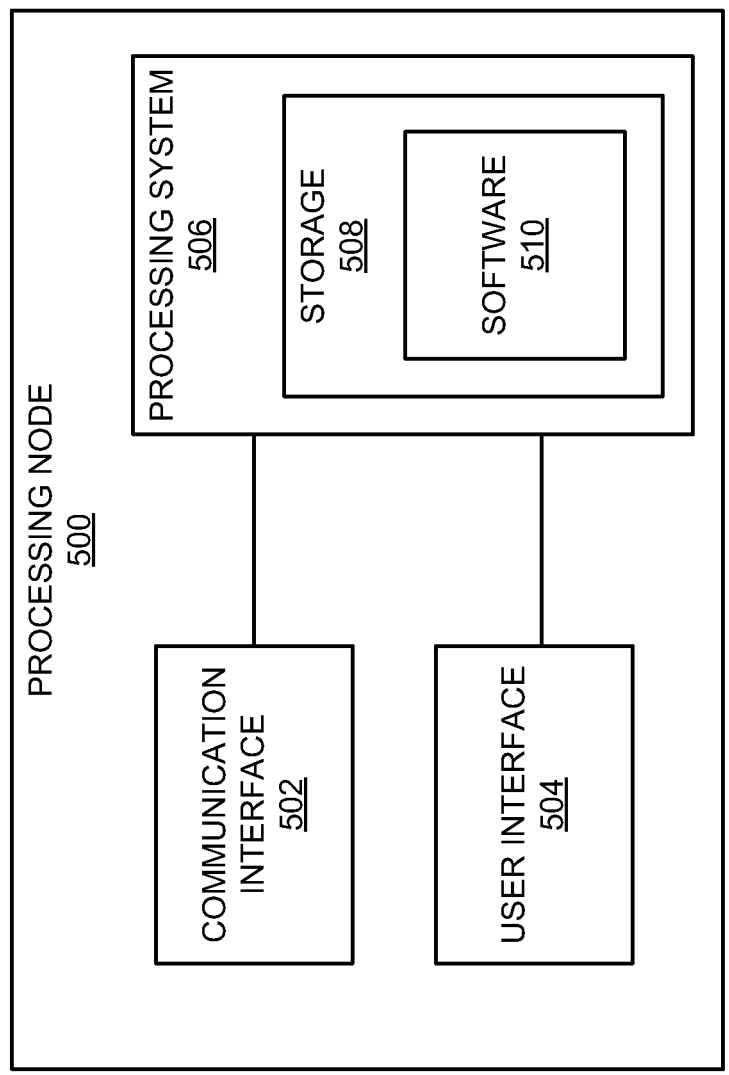
FIG. 5 illustrates a processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

An example of processing node 500 includes access node 110. Processing node 500 can also be an adjunct or component of a network element, such as an element of access node 110, MIMO access node 210, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    allocating a first subframe of air interface resource elements, the first subframe comprising a first plurality of air interface resource elements, the first plurality of air interface resource elements including a first plurality of reference signal resource elements and a first plurality of data signal resource elements;
    allocating a second subframe of air interface resource elements, the second subframe comprising a second plurality of air interface resource elements, the second plurality of air interface resource elements including a second plurality of reference signal resource elements and a second plurality of data signal resource elements, wherein at least one of said second plurality of data signal air interface elements is placed in a time and frequency location in the second subframe that corresponds to a time and frequency location of at least one of the first plurality of reference signal air interface elements in the first subframe; and
    simultaneously transmitting, using a multi-antenna mode, the first subframe from a first antenna after applying a first orthogonal code of a family of orthogonal codes to said first subframe and the second subframe from a second antenna after applying a second orthogonal code of said family of orthogonal codes to said second subframe, the first orthogonal code being different from the second orthogonal code, wherein at least one reference signal resource element from the first antenna is transmitted simultaneously with at least one data signal resource element from the second antenna.

2. The method of claim 1, wherein the first plurality of data signal resource elements correspond in time and frequency to said second plurality of reference signal resource elements.

3. The method of claim 1, wherein the second plurality of data signal resource elements corresponding in time and frequency to said first plurality of data signal resource elements.

4. The method of claim 1, wherein the first plurality of data signal resource elements correspond in time and frequency to at least a portion of said second plurality of reference signal resource elements and correspond in time and frequency to at least a portion of said second plurality of data signal resource elements.

5. The method of claim 1, wherein the first plurality of reference signal resource elements correspond in time and frequency to at least a portion of said second plurality of reference signal resource elements and correspond in time and frequency to at least a portion of said second plurality of data signal resource elements.

6. A communication system, comprising:
    a wireless station, comprising a processor and memory, that communicates using a multi-antenna air interface, the wireless station simultaneously transmitting a first subframe from a first antenna and a second subframe from a second antenna, the first subframe having a first plurality of reference signal air interface elements and a first plurality of data signal air interface elements, the second subframe having a second plurality of reference signal air interface elements and a second plurality of data signal air interface elements, the first plurality of reference signal air interface elements encoded with a first orthogonal code of a family of orthogonal codes and the second plurality of data signal air interface elements encoded with a second orthogonal code of said family of orthogonal codes, the first orthogonal code being different from the second orthogonal code, wherein at least one reference signal resource element from the first antenna is transmitted simultaneously with at least one data signal resource element from the second antenna; and
    an air interface resource allocation system, comprising a processor and memory, that places at least one of said second plurality of data signal air interface elements in a time and frequency location in the second subframe that corresponds to a time and frequency location of at least one of the first plurality of reference signal air interface elements in the first subframe.

7. The communication system of claim 6, wherein the wireless station simultaneously transmits with the first subframe and the second subframe, a third subframe from a third antenna, the third subframe having a third plurality of reference signal air interface elements and a third plurality of data signal air interface elements, the third plurality of reference signal air interface elements encoded with a third orthogonal code of the family of orthogonal codes and said air interface resource allocation system places said third plurality of reference signal air interface elements in time and frequency locations in the third subframe that correspond to time and frequency locations of the first plurality of reference signal air interface elements in the first subframe.

8. The communication system of claim 6, wherein said first plurality of data signal resource elements are encoded with said first orthogonal code and said second plurality of reference signal resource elements are encoded with said second orthogonal code.

9. The communication system of claim 7, wherein said third plurality of data signal air interface elements are encoded with said third orthogonal code.

10. The communication system of claim 7, wherein said first plurality of data signal resource elements are encoded with said first orthogonal code.

11. The communication system of claim 10, wherein said third plurality of data signal resource elements are encoded with said third orthogonal code.

12. The communication system of claim 7, wherein the first plurality of data signal air interface elements are encoded with the first orthogonal code, the second plurality of reference signal air interface elements are encoded with the second orthogonal code, and the third plurality of data signal air interface elements are encoded with the third orthogonal code.

13. The communication system of claim 6, wherein the first plurality of data signal air interface elements are not encoded with the first orthogonal code and the second plurality of reference signal air interface elements are not encoded with the second orthogonal code.

14. A method of operating a communication system, comprising:
allocating a first subframe of air interface resource elements, the first subframe comprising a first plurality of air interface resource elements, the first plurality of air interface resource elements including a first plurality of reference signal resource elements and a first plurality data signal resource elements;
allocating a second subframe of air interface resource elements, the second subframe comprising a second plurality of air interface resource elements, the second plurality of air interface resource elements including a second plurality of reference signal resource elements and a second plurality data signal resource elements, the second plurality of reference signal resource elements corresponding in time and frequency to said first plurality of reference signal resource elements; and,
simultaneously transmitting, using a multi-antenna mode, the first subframe from a first antenna after applying a first orthogonal code of a family of orthogonal codes to said first plurality of reference signal resource elements and the second subframe from a second antenna after applying a second orthogonal code of said family of orthogonal codes to said second plurality of reference signal resource elements, the first orthogonal code being different from the second orthogonal code, wherein at least one reference signal resource element from the first antenna is transmitted simultaneously with at least one data signal resource element from the second antenna, wherein at least one of said second plurality of data signal air interface elements is placed in a time and frequency location in the second subframe that corresponds to a time and frequency location of at least one of the first plurality of reference signal air interface elements in the first subframe.

15. The method of claim 14, wherein the first plurality of data signal resource elements correspond in time and frequency to said second plurality of data signal resource elements.

16. The method of claim 15, wherein the first orthogonal code is applied to said first plurality of data signal resource elements and said second orthogonal code is applied to said second plurality of data signal resource elements.

17. The method of claim 15, wherein said first orthogonal code is applied to said air interface resource elements of said first subframe of air interface resource elements.

18. The method of claim 14, wherein said second orthogonal code is applied to said air interface resource elements of said second subframe of air interface resource elements.

19. The method of claim 14, wherein said first orthogonal code is applied to said air interface resource elements of said first subframe of air interface resource elements and said second orthogonal code is applied to said air interface resource elements of said second subframe of air interface resource elements.

* * * * *